United States Patent [19]

Rhudy et al.

[11] 4,011,910

[45] Mar. 15, 1977

[54] POLYMER FLOODING IN HIGH PERMEABILITY RESERVOIRS

[75] Inventors: John S. Rhudy; William B. Gogarty; Bruce L. Knight, Littleton; James H. Fullinwider, Aurora, all of Colo.

[75] Assignee: Marathon Oil Company, Findlay, Ohio

[22] Filed: June 13, 1973

[21] Appl. No.: 369,642

[52] U.S. Cl. .................................. 166/274; 166/294
[51] Int. Cl.² ............................................. E21B 43/22
[58] Field of Search ..................... 166/273, 274, 294

[56] References Cited
UNITED STATES PATENTS

| | | | |
|---|---|---|---|
| 3,724,545 | 4/1973 | Knight | 166/274 |
| 3,208,518 | 9/1965 | Patton | 166/275 |
| 3,500,924 | 3/1970 | Poettmann | 166/273 |
| 3,523,581 | 8/1970 | Murphy | 166/273 |
| 3,589,444 | 6/1971 | Johnson | 166/274 |
| 3,687,199 | 8/1972 | Jennings | 166/274 |

*Primary Examiner* — Ernest R. Purser
*Attorney, Agent, or Firm* — Joseph C. Herring, Jack L. Hummel

[57] ABSTRACT

Mobility control is improved in secondary-type oil recovery through injection of two aqueous polymer solutions. The polymer of the first solution has an average molecular weight of at least 10 million and the polymers effect a substantial reduction of permeability of the reservoir flooded. The second solution contains a polymer which does not substantially change rock permeability, but imparts a viscosity increase to the solution. An example of the polymer used in the first solution is a high molecular weight polyacrylamide and in the second solution is a biopolymer such as a polysaccharide.

1 Claim, 2 Drawing Figures

POLYMER FLOODING IN HIGH PERMEABILITY RESERVOIRS

BACKGROUND OF THE INVENTION

Field of the Invention:

This invention relates to injecting at least two fluids into a subterranean oil-bearing formation.

Description of the Prior Art:

Mobility reducing agents have been used in secondary waterflooding operations to realize improved hydrocarbon recoveries. U.S. 3,039,529 to McKennon teaches that about 100 to about 5,000 p.p.m. of a high molecular weight, partially hydrolyzed polyacrylamide is useful for this purpose. U.S. 2,771,138 to Beeson uses as viscosity increasing agents in waterflooding processes naturally occurring gums, synthetic polymers (including copolymers) sucrose, crude sugar, etc. Improved mobility control has also been obtained using a mobility buffer slug behind a miscible or miscible-like displacing agents, e.g. see U.S. Patent Nos. 3,254,714 to Gogarty et al.; 3,497,006 to Jones, et al.; 3,506,070 and 3,506,071 to Jones.

The prior art teaches that the front portion of a waterflood preferably contains a viscosity increasing agent. This results in favorable flooding conditions, e.g. less fingering of the drive fluid into the crude oil and more efficient overall hydrocarbon recoveries. More specifically, it is preferable that the frontal portion of a waterflood have a mobility equal to or less than that of the crude oil to be displaced from the reservoir. Subsequently, the mobility of the waterflood is gradually increased until it is equal to or approaches that of a subsequent drive water.

Improved mobility control in a waterflooding process may be obtained by reducing the relative permeability of the formation rock to the flow of water and/or by admixing an agent with the water to increase the viscosity thereof. An accepted practice is to incorporate into the waterflood a single agent, e.g. a partially hydrolyzed, molecular weight polyacrylamide, to impart mobility control. These polymers, however, have characteristically broad molecular weight distributions, and therefore only a small fraction of the polymer may be effective in obtaining a substantial permeability reduction of the reservoir rock. This fraction may typically be ten percent (or less) of the total polymer present. Once a substantial permeability reduction is obtained, the high molecular weight fraction, which was incorporated into the rock to obtain such reduction, is no longer present in the aqueous polymer solution, and therefore mobility control due to permeability reduction is no longer possible. The use of a single aqueous polymer solution is therefore inefficient and may often be ineffective.

Moreover, the use of aqueous polymer solutions to obtain improved mobility control has heretofore been limited to low-to-intermediate permeability formations since the generally used polymers do not contain a sufficiently large fraction of very high molecular weight polymer to be effective in the permeability reduction of high permeability formations.

SUMMARY OF THE INVENTION

Applications have discovered a method of improving mobility control in flooding subterranean formations having an average permeability of at least about 500 md. This is obtained by injecting at least two separate aqueous polymer solutions. The first solution contains a polymer having an average molecular weight of at least about 10,000,000, the molecular weight being sufficiently high to effect a substantial permeability reduction. The second solution contains a polymer which will impart increased viscosity without substantially affecting formation permeability. The combination of injecting these two solutions provides an economical and effective method of obtaining improved mobility control and increasing hydrocarbon recoveries from highly permeable formations.

DESCRIPTION OF THE PREFERRED EMBODIMENTS

Figure 1:
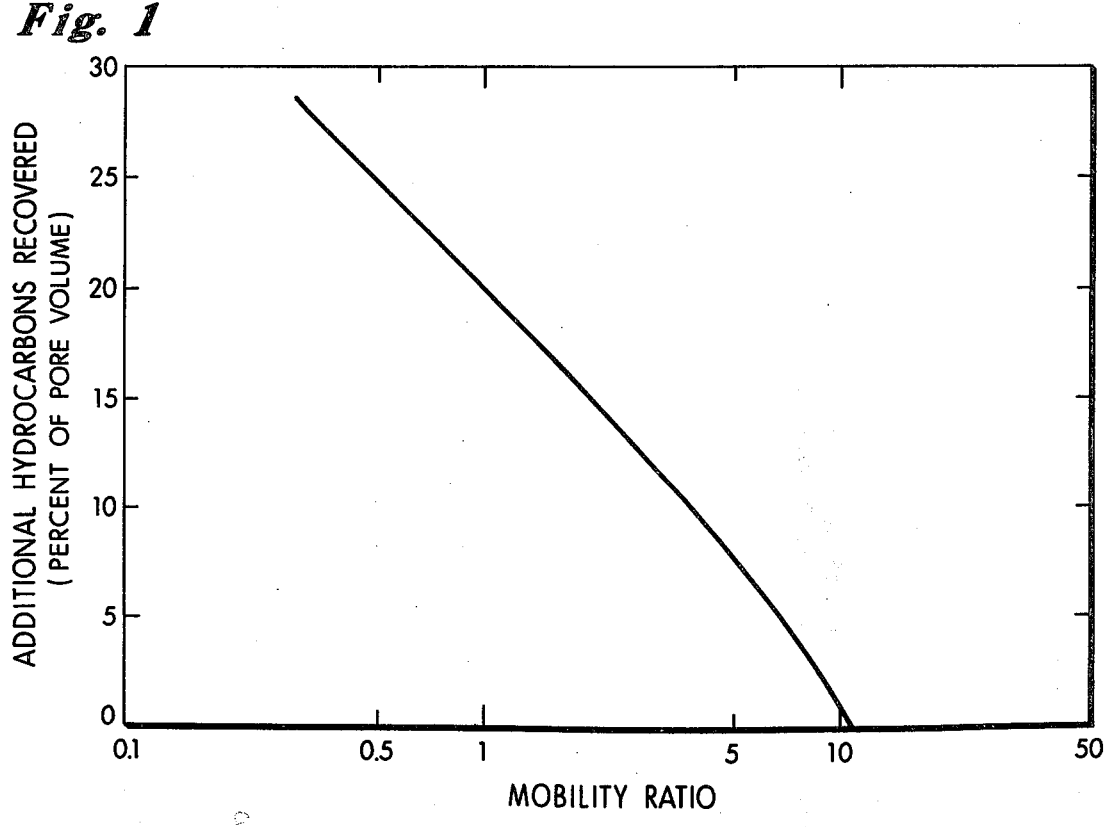
FIG. 1 is a graph showing the additional hydrocarbon recovery obtained by reducing the mobility of waterflooding with high molecular polyacrylamide polymers. (Mobility ratio is defined as the mobility of the displacing phase divided by the mobility of the displaced phase.)
Figure 2:
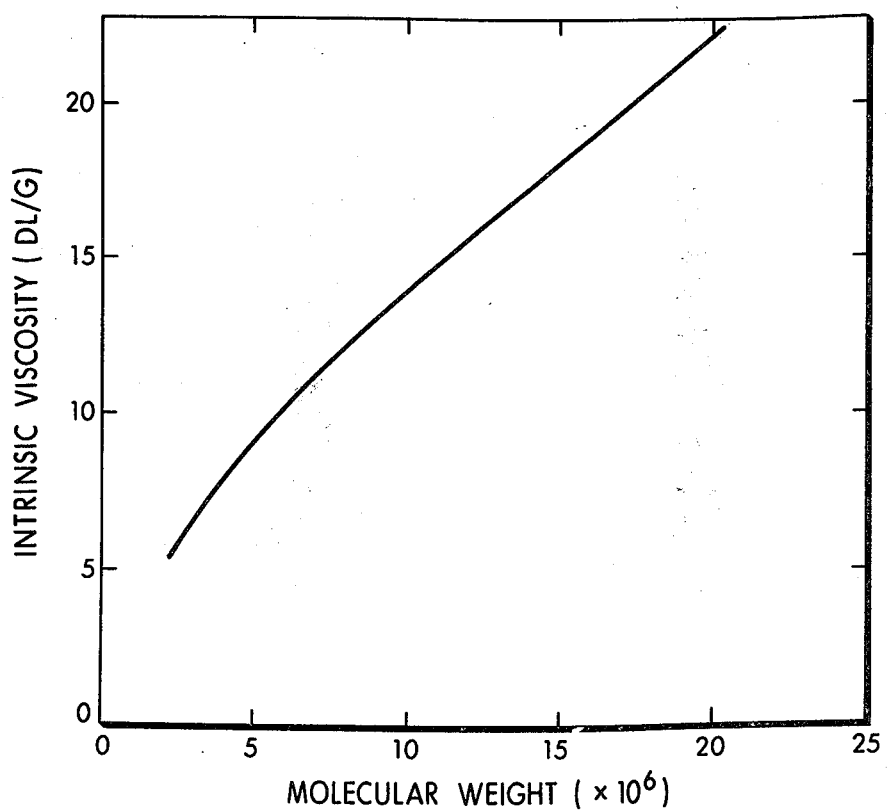
FIG. 2 is a graph depicting the relationship between molecular weight of various polymers tested and their intrinsic viscosity.

Particularly useful polymers for effecting permeability reduction are the synthesized organic homopolymers, copolymers, terpolymers, etc. and chemically modified and/or chemically sbustituted modifications thereof. The polymers can have an average molecular weight preferably above about 10,000,000, and more preferably above about 15,000,000. The preferred molecular weight is dependent upon the properties of each specific reservoir. Generally, reservoirs having higher permeabilities require higher molecular weight polymers. Especially useful polymers are the polyacrylamides having about 10-70% of the carboxyamide groups hydrolyzed to carboxyl groups. Examples include the Pusher-700 polymer and NC-1870 polymer, both marketed by Dow Chemcial Co., Midland, Michigan, U.S.A., Pusher is a trademark of Dow Chemical Co. Also useful are the acrylamide-sodium acrylate copolymers having average molecular weights above about 10,000,000, e.g. the Nalco liquid polymers (marketed by the Petroleum Division, Nalco Chemical Co., Houston, Texas, U.S.A.). Concentrations of the polymer in the aqueous solution can be about 50 to about 2,000 p.p.m. and about .01 to about 0.5 pore volumes, more preferably about .05 to about .35 pore volumes and most preferably about .10 to about .25 pore volumes are useful. The polymer of this first solution is designed to substantially satisfy polymer loss requirements due to partial plugging of the formation rock.

Polymers of the second aqueous polymer solution include biopolymers, homopolymers, copolymers, terpolymers, etc., and chemically modified and/or chemically substituted products thereof. Preferred polymers are biopolymers including polysaccharides and their derivatives (e.g. Kelzan-MF, a polysaccharide polymer marketed by Xanco Division of Kelco Chemical Co., San Diego, California, U.S.A.) and high molecular weight, partially hydrolyzed polyacrylamide and its derivatives. Also useful are water soluable linear, high molecular weight monoalkyl aryl aromatic sulfonate polymers as defined in U.S. 3,067,161 to Ross and other viscosity increasing agents as defined in U.S. 2,728,725 to Gloor; 3,050,778 to Konia et al; and 3,000,830 to Faun et al. A preferred polymer is an N-sulfo-hydrocarbon-substituted acrylamide polymer, e.g. defined in U.S. 3,679,000 to Kaufman. Molecular weights of these polymers can be about 500,000 to about 10,000,000, more preferably about 1,000,000 to about 6,000,000 and most preferably about 2,000,000 to about 5,000,000. Polymer concentrations of about 100 to about 2,000 p.p.m. are preferred and quantities of about .05 to about 2.0 pore volumes, more preferably about .1 to about 1.5 pore volumes and most preferably about .2 to about 1.0 pore volumes are useful.

The water within the aqueous polymer solutions, to obtain the most effective permeability reduction and viscosity imparting property, preferably contains less than 10,000 p.p.m. and more preferably less than 5,000 p.p.m. of TDS (total dissolved solids). Of course, soft water, or water containing down to 500 or less p.p.m. of TDS permits efficient permeability reduction and increased viscosity.

A flooding agent, such as a miscible agent, miscilbelike agent, a hydrocarbon or water solubilizing agent, an immiscible agent or any other agent which tends to miscibilize or solubilize fluids within the formation or which will displace fluids from the formation may be useful with the invention, preferably injected prior to the injection of the aqueous polymer solutions. Examples of useful flooding agents include oil- and water-external emulsions, oil- and water-external micellar dispersions, hydrocarbon and/or water containing alcohols or similar semi-polar organic compounds, surfactants, electrolytes, or like materials or mixtures thereof. Specific flooding agents are taught in U.S. Patent Nos. 3,254,714 to Gogarty et al.; 3,376,925 to Coppel; 3,330,344 to Reisberg; 3,354,953 to Morse, 3,373,809 and 3,446,282 to Cook, Jr. et al, etc. The preferred flooding agent is a micellar dispersion.

EXAMPLES

The following examples are not intended to limit the invention in any way. Rather, all equivalents obvious to those skilled in the art are intended to be included within the scope of the invention as defined herein.

EXAMPLE 1

Sand packs having an average permeability of about 5,000 md. are obtained with Ottawa sand packed into a cylindrical shaped container having an inlet and an outlet means. The sandpacks are first flooded with water and thereafter with crude oil having a viscosity of 210 cp. at 23° C. and are then flooded with 0.2 pore volumes of an aqueous polymer solution containing 125 p.p.m. of a copoylmer of acrylamide and sodium acrylate having a molecular weight of about 25,000,000 followed by 0.9 pore volume of an aqueous solution containing 250 p.p.m. of Dow Pusher 700 Series polymer (a partially hydrolyzed, high molecular weight polyacrylamide). As compared to a conventional polymer flood, i.e. 1.1 pore volumes of water containing 250 p.p.m. of Dow Pusher 700 Series polymer, the combination of the polymer solutions obtained improved oil recoveries.

EXAMPLE 2

Sandstone reservoir plugs 1" in diameter x 3" long are cleaned and then resaturated with water. Initial permeability to water is 1400 md. Five pore volumes of 700 p.p.m. polymer solution in water containing about 400 p.p.m. TDS are injected at a constant rate of 10 ft./day. Water is then flushed through the core to measure a permeability reduction due to polymer.

Case 1

Five pore volumes of a polymer solution containing 700 p.p.m. of a copolymer of acrylamide and sodium acrylate is used (intrinsic viscosity=about 20 dl./g.). At the end of 5 PV injection, this solution gave a reciprocal mobility of 76 cp. However, the reciprocal mobility was slowly increasing which indicates that a small fraction of the polymer is continually being lost and causing permability reduction. Permeability reduction caused by this polymer is about 34 (the polymer solution had an effective viscosity of 2.24 cp.).

Case 2

Same as Case 1 except 2 PV of 700 p.p.m. of the copolymer is injected and followed by 3 PV of 700 p.p.m. Kelzan MF solution. Reciprocal mobility is 92 cp. after 5 PV total injection and was stabilized, indicating that no polymer was being lost to the rock. Permeability reduction is 30 (effective viscosity=3.08 cp.).

The two stage polymer injection sequence is an improvement over the single polymer flood since: 1) higher levels of reciprocal mobility are attained through higher effective viscosity levels with less permeability reduction (i.e. requires less polymer for a given level of mobility control); 2) polymer loss to the rock is satisfied and reciprocal mobility is stabilized; and 3) higher injectivity of drive water is possible (lower permeability reduction by polymer is proportional to increased drive water injectivity).

What is claimed is:

1. In a process of recovering hydrocarbon from a hydrocarbon-bearing subterranean formation having a stratum(s) which has a permeability greater than 500 md. and having at least one injection means in fluid communication with at least one production means and wherein an aqueous polymer solution is injected into the stratum and displaced toward the production means to recover hydrocarbon therethrough, the improvement comprising:

(1) injecting a first aqueous polymer solution comprised of a polymer having an average molecular weight greater than 10,000,000 and the molecular weight being sufficiently large to substantially effect a permeability reduction of the formation rock to the flow of the aqueous polymer solution, and (2) then injecting a second aqueous polymer solution comprised of an N-sulfohydrocarbon-substituted acrylamide polymer having an average molecular weight less than 10,000,000 and the molecular weight being sufficiently low to not substantially effect a further permeability reduction of the formation rock but the molecular weight being sufficiently large to impart increased viscosity to the second aqueous polymer solution for favorable mobility control in the displacement of hydrocarbon from the formation.

* * * * *